United States Patent
Zudrell-Koch et al.

(10) Patent No.: US 8,947,007 B2
(45) Date of Patent: Feb. 3, 2015

(54) HIGH EFFICIENCY INDUCTOR-LESS OFF-LINE LED DRIVER

(75) Inventors: Stefan Zudrell-Koch, Hohenems (AT); Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 214 days.

(21) Appl. No.: 13/561,603

(22) Filed: Jul. 30, 2012

(65) Prior Publication Data
US 2013/0257277 A1     Oct. 3, 2013

(30) Foreign Application Priority Data
Mar. 30, 2012  (EP) .................................... 12162436

(51) Int. Cl.
*H05B 37/02* (2006.01)
(52) U.S. Cl.
USPC ........................... 315/224; 315/186; 315/291
(58) Field of Classification Search
CPC ........... H05B 33/0815; H05B 33/0851; H05B 37/02; H05B 39/02; H05B 41/16; H02M 3/04; H02M 3/07; H02M 3/158
USPC ............. 315/185 R, 186, 192, 193, 224, 246, 315/291, 307, 308; 323/222, 282, 284
See application file for complete search history.

(56) References Cited

U.S. PATENT DOCUMENTS

| | | | | |
|---|---|---|---|---|
| 5,565,761 A | * | 10/1996 | Hwang | ........................... 323/222 |
| 7,492,108 B2 | * | 2/2009 | Garcia et al. | .................. 315/291 |
| 8,076,920 B1 | * | 12/2011 | Melanson | ...................... 323/299 |
| 8,569,976 B2 | * | 10/2013 | Shteynberg et al. | .......... 315/307 |
| 2009/0289557 A1 | * | 11/2009 | Itoh et al. | ........................ 315/127 |
| 2010/0181973 A1 | * | 7/2010 | Pauritsch et al. | ............. 323/280 |
| 2010/0314985 A1 | * | 12/2010 | Premysler | ........................ 313/46 |
| 2011/0095704 A1 | | 4/2011 | Moussakov et al. | |

FOREIGN PATENT DOCUMENTS

EP       0 766 221       4/1997
WO    WO 2009/060400    5/2009

OTHER PUBLICATIONS

European Search Report 12162436.5-2206 Mail date—Sep. 11, 2012, Dialog Semiconductor GmbH.

* cited by examiner

*Primary Examiner* — Tung X Le
(74) *Attorney, Agent, or Firm* — Saile Ackerman LLC; Stephen B. Ackerman (57) ABSTRACT

The present document relates to providing power for driving SSL devices. A power converter converts a varying input voltage to supply an output voltage to a SSL device in series with a current source. The power converter comprises one or more capacitors; a plurality of switches to couple the capacitors in a plurality of configurations. A control unit operates the power converter in a plurality of operational modes providing a corresponding plurality of different conversion ratios between the input/output voltages. The operational modes comprise a first phase and a second phase, during which the capacitors are differently arranged. The control unit controls the switches to alternate between the phases at a commutation cycle rate. The control unit sets the operational mode based on the varying input voltage.

42 Claims, 5 Drawing Sheets

HIGH EFFICIENCY INDUCTOR-LESS OFF-LINE LED DRIVER

TECHNICAL FIELD

The present document relates to illumination systems. In particular, the present document relates to a method and system for providing power to and for driving solid state lighting devices such as LED or OLED assemblies.

BACKGROUND

It is a general trend that solid state lighting (SSL) devices, such as Light Emitting Diodes (LEDs) or Organic LEDs (OLEDs), move towards SSL devices which are operated at higher voltage and less current, in order to improve the overall efficiency of the SSL devices. SSL devices at high voltage may be constructed by arranging a large number of SSL devices (e.g. a large number of LEDs) in series (using e.g. a monolithic approach or a COB (Chip-on-Board) approach).

SSL devices which are operated at high voltage levels (e.g. in the range of 50V or 150V . . . 200V) may be driven using little to no driver electronics, which leads to low cost. In particular, at low power levels (in the range of 4 W or less), a simple resistor may be used as a current limiter in combination with a high voltage SSL device. Lamp assemblies based on such simple driver electronics suffer, however, from a number of drawbacks, such as a low efficiency (<30 lm/W on lamp level), a high sensitivity to mains voltage changes, and a high sensitivity to the tolerancing tolerances of the SSL device. Furthermore, such lamp assemblies tend to flicker, and are typically not dimmable.

It is a challenge for engineers designing SSL devices overcoming the above mentioned shortcomings.

The present document addresses the above mentioned shortcomings of LED driver circuits.

SUMMARY OF THE DISCLOSURE

A principal object of the present disclosure is to achieve high efficiency of SSL devices.

A further object of the disclosure is to reduce sensitivity of SSL devices to mains voltage changes.

A further object of the disclosure is to reduce sensitivity of SSL devices to tolerances thereof.

A further object of the disclosure is to provide a small, low cost driver circuit and power converter thereof extending the usable range of the mains power to high voltage SSL devices as e.g. high voltage (HV) LEDs.

According to an aspect, a power converter configured to convert a varying input voltage at an input into an output voltage at an output is described. The power converter may be particularly adapted to provide an output voltage to a solid state lighting (SSL) device, such as an LED or an OLED. In particular, the power converter may be configured to supply the output voltage to a SSL device which is arranged in series with a current source. The current source may be arranged between the SSL device and ground and/or the current source may be arranged between the SSL device and the output voltage provided by the power converter.

The varying input voltage may have been derived from a mains supply (e.g. an 110V or a 230V mains supply at a mains frequency of e.g. 60 Hz or 50 Hz). The mains supply voltage may have been rectified using a (half wave or full wave) rectifier. As such, the input voltage may have a rectified half wave or full wave sinusoidal waveform, thereby varying from a minimum voltage value (e.g. 0V) to a maximum voltage value (e.g. 300V).

The power converter may comprise one or more capacitors and a plurality of switches, configured to couple the one or more capacitors with one another, with the input and/or with the output of the power converter, according to a plurality of configurations. As such, the power converter may make use of one or more switched capacitors, in order to convert the varying input voltage into the output voltage. The plurality of switches may be transistors (e.g. MOSFET or CMOS transistors).

The power converter comprises a control unit which is configured to operate the power converter in a plurality of operational modes. In particular, the control unit may be configured to operate the power converter in one of the plurality of operational modes, based on the momentary voltage value of the varying input voltage. For this purpose, the power converter (e.g. the control unit) may be configured to measure the momentary value of the input voltage and select an appropriate operational mode of the power converter, depending on the momentary value of the input voltage.

The plurality of operational modes of the power converter provides a corresponding plurality of different conversion ratios between the input voltage and the output voltage, respectively. The conversion ratio may allow for a step-up conversion (i.e. a conversion ratio greater one, e.g. 2 or an arbitrary multiple of one) and/or for a step-down conversion (i.e. a conversion ratio smaller than one, e.g. 0.5 or 1/3). The plurality of operational modes may comprise one or more operational modes which make use of switched capacitor power conversion. In particular, a first operational mode of the plurality of operational modes may comprises a first phase, during which the one or more capacitors are arranged in a first configuration from the plurality of configurations, and a second phase, during which the one or more capacitors are arranged in a different second configuration from the plurality of configurations. The control unit may be configured to control the plurality of switches in order to alternate between the first phase and the second phase, wherein the first phase (and the second phase) may be repeated at a commutation cycle rate, thereby operating the power converter in the first operational mode. In particular, the control unit may be configured to alternate between the first phase and the second phase of the first operational mode, such that an average charge across the one or more capacitors is maintained constant. Typically, the power converter comprises a plurality of such switched capacitor operational modes, each of the switched capacitor operational modes providing a different voltage conversion ratio (for a step-up conversion and/or for a step-down conversion). In an embodiment, the control unit may be configured to modify or vary the commutation cycle rate, e.g. in a continuous manner.

It should be noted that a particular operational mode made comprise more than two phases (e.g. three or four phases). As such, the control unit may be configured to control the plurality of switches in order to cycle through the plurality of phases of the particular operation mode at a commutation cycle rate, thereby operating the power converter in the particular operational mode.

As indicated above, the control unit may be configured to select and set one of the plurality of operational modes based on the varying input voltage. For this purpose, the control unit may be configured to measure the input voltage, e.g. at a pre-determined execution rate. Typically, the input voltage is derived from a rectified version of the mains supply voltage alternating at the mains frequency. Consequently, the input voltage may vary in accordance to the mains frequency. The power converter may be configured to synchronize with the main frequency (e.g. by repeatedly detecting a pre-determined value of the input voltage). In other words, the control unit may be configured to set one of the pluralities of operational modes in sync with the mains frequency.

Overall, the power converter may be operable in a plurality of different (switched capacitor) operational modes, providing a plurality of different conversion rates. The power converter (e.g. the control unit) may be configured to switch between the different operational modes, based on the varying input voltage, in order to control the output voltage. In particular, the control unit may be configured to select and/or set one of the pluralities of operational modes, such that the output voltage does not exceed a pre-determined maximum voltage. In other words, the control unit may be configured to select and/or set one of the plurality of operational modes, such that a voltage drop across the current source does not exceed a pre-determined maximum current source voltage. Alternatively, the selection of operational modes may be such that the power loss on the current source is minimized, e.g. below a pre-determined power loss. The pre-determined maximum voltage may comprise a pre-determined (constant) load voltage for the SSL device and a pre-determined maximum voltage drop across the current source. Alternatively or in addition, the control unit may be configured to select and/or set one of the plurality of operational modes, such that the output voltage meets or exceeds the pre-determined load voltage of the SSL device (at least for a pre-determined fraction of time, e.g. for at least 80%, or 90% of the time).

An operational mode with a step-up conversion ratio providing an output voltage greater than the input voltage may be used in cases where the varying input voltage falls below the pre-determined (constant) load voltage for the SSL device. As such, it can be ensured that in situations where the varying input voltage takes on relatively low values, the power converter still provides an output voltage which is sufficiently high for driving the SSL device.

The control unit may further be configured to control the current through the SSL device. This may be achieved by providing a controllable current source. The control unit may then drive the current source so as to provide the desired current flowing through the SSL device, thereby generating the desired light intensity which is in general proportional to the SSL drive current. In order to make use of the different voltage drops at current source in the different operational modes (and thereby the resulting power losses at the current source), the current source may be controlled depending on the current operational mode. In other words, the control unit may be configured so as to control the current flowing through the SSL device to be depending on the present operational mode. Thus, the current may be different for at least some of the plurality of operational modes. This allows to have operational modes with a higher current (and a higher light intensity) and a smaller voltage drop at the current source than for other operational modes having a higher voltage drop. Hence, the light intensity may vary between the operational modes, while the power loss for the operational modes may be substantial equal. If the frequency of the light intensity fluctuations is high enough (e.g. >100 Hz, preferably 200 Hz or 400 Hz), the human eye will not notice these fluctuations and perceive the average intensity.

The power converter may be implemented as an integrated circuit on a single chip or in a single package, with only the one or more capacitors being external to the integrated circuit.

According to another aspect, a driver circuit configured to control a solid state lighting (SSL) device is described. The driver circuit comprises a power converter (e.g. a first power converter) according to any of the aspects outlined in the present document. The power converter is configured to convert a varying input voltage at an input of the power converter into an output voltage at an output of the power converter. Furthermore, the power converter comprises a current source at the output of the power converter. The current source may be configured to supply a constant current to the SSL device, when the SSL device is coupled to the output of the power converter. Typically, the current source is arranged in series with the SSL device, thereby directly controlling the current through the SSL device. By controlling the current through the SSL device, the current source may control the intensity of the light emitted by the SSL device. The driver circuit may further comprise a rectifier configured to rectify a voltage waveform of the mains power supply to the input voltage. The driver circuit may be implemented as an integrated circuit on a single chip or in a single package, with only the one or more capacitors of the power converter being external to the integrated circuit.

The driver circuit may be configured to control a second SSL device. For this purpose, the driver circuit may comprise a second power converter according to any of the aspects outlined in the present document. The second power converter may be configured to supply a drive voltage to the second SSL device. As outlined above, the power converters may be operable in a plurality of operational modes comprising respective first phases and second phases. In particular, the power converters may be operated in opposed phases, i.e. when the first power converter is operated in the first phase of a particular operational mode of the plurality of operational modes, the second power converter may be operated in the second phase of the particular operational mode of the plurality of operational modes, and vice versa. By operating the power converters in phase opposition, the current drawn from the mains may become more constant and the need for electromagnetic interference filters at the driver circuit may become obsolete or reduced.

According to a further aspect, a light bulb assembly is described. The light bulb assembly typically comprises a solid state lighting (SSL) device and a driver circuit according to any of the aspects outlined in the present document. Furthermore, the light bulb assembly typically comprises an electrical connection module (e.g. a screw type connection module) for connecting the light bulb assembly with the mains voltage supply.

According to another aspect, a method for converting a varying input voltage into an output voltage for a solid state lighting (SSL) device arranged in series with a current source is described. The method comprises measuring the input voltage and selecting an operational mode based on the measured input voltage. The selected operational mode provides a conversion ratio between the input voltage and the output voltage. Furthermore, the selected operational mode comprises a first phase and a second phase. During the first phase, the method comprises configuring one or more capacitors using a plurality of switches according to a first configuration, and during the second phase, the method comprises configuring the one or more capacitors using the plurality of switches according to a different second configuration. The selected operation mode is implemented by alternating between the first phase and the second phase at a commutation cycle rate. The method may be executed in a repeated manner at an execution rate.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

In accordance to the objectives of the disclosure a SSL light bulb assembly has been achieved. The SSL light bulb assemble firstly comprises: a SSL device, a driver circuit, converting supply electricity received through an electrical connection module into a controlled drive current for the SSL device, comprising: a first power converter converting a varying input voltage at an input of the power converter into an output voltage at an output of the power converter supplying the output voltage to the solid state lighting. The power converter comprises: one or more capacitors and a plurality of switches coupling said one or more capacitors with one another, with the input and/or with the output of the power converter according to a plurality of configurations. Furthermore the driver circuit comprises a control unit operating the power converter in a plurality of operational modes providing a corresponding plurality of different conversion ratios between the input voltage and the output voltage of the power converter and a current source at the output of the first power converter, supplying a constant current to the SSL device, when the SSL device is coupled to the output of the first power converter.

In accordance to the objectives of the disclosure a driver circuit to control a solid state lighting has been achieved. The driver circuit firstly comprises: a first power converter converting a varying input voltage at an input of the power converter into an output voltage at an output of the power converter supplying the output voltage to the solid state lighting, wherein the power converter comprises: one or more capacitors and a plurality of switches coupling said one or more capacitors with one another, with the input and/or with the output of the power converter according to a plurality of configurations. Furthermore the driver circuit comprises a control unit operating the power converter in a plurality of operational modes providing a corresponding plurality of different conversion ratios between the input voltage and the output voltage of the power converter.

In accordance to the objectives of the disclosure a power converter to convert a varying input voltage at an input into an output voltage at an output; wherein the power converter is configured to supply the output voltage to a solid state lighting device in series with a current source has been achieved. The power converter disclosed firstly comprises an input port to receive a rectified input voltage, a first switch, wherein a first terminal of the switch is connected to the input port and a second terminal of the first switch is connected to a first output port, and a first capacitor, wherein a first terminal is connected to the input port and a second terminal is connected to an anode of a first diode to a cathode of a second diode and to a first terminal of a second capacitor. Furthermore the power converter comprises said first diode, wherein a cathode is connected to the first output port, said second diode wherein an anode is connected to a second output port, and said second capacitor, wherein a second terminal is connected to ground. Finally the power converter comprises a second switch wherein a first terminal is connected to the second output port and a second terminal is connected to ground, and said first and second output ports wherein a load is connected between both output ports.

In accordance to the objectives of the disclosure a power converter to convert a varying input voltage at an input into an output voltage at an output; wherein the power converter is configured to supply the output voltage to a solid state lighting device in series with a current source has been achieved. The power converter disclosed firstly comprises: an input port to receive a rectified input voltage, a first switch, wherein a first terminal of the switch is connected to the input port and a second terminal of the first switch is connected to a first terminal of a second switch, to a first terminal of a third switch, and to a first terminal of a first capacitor, and said second switch wherein a second terminal is connected to an output port of the power converter. Furthermore the power converter comprises: said third switch wherein a second terminal of the second switch is connected to a first terminal of a second capacitor and to a second terminal of a fourth switch, said first capacitor, wherein a second terminal is connected to a first terminal of the fourth switch and to a first terminal of a fifth switch, said fourth switch, and said fifth switch wherein a second terminal of the fifth switch is connected to a second terminal of the second capacitor. Finally the power converter comprises said second capacitor wherein a second terminal is connected to an anode of a first diode and to a cathode of a second diode, said first diode, wherein a cathode is connected to the output port, said second diode wherein an anode is connected to ground, and said output port wherein a load is connected between the output port and ground.

In accordance to the objectives of the disclosure a method for converting a varying input voltage into an output voltage for a solid state lighting device in series with a current source has been achieved. The method firstly comprises the following process steps: (1) providing a SSL, a driver circuit comprising a control unit, a means to couple and decouple a plurality of components, a load current source, and a capacitor, (2) measuring the input voltage, and (3) selecting an operational mode based on the measured input voltage, wherein the selected operational mode provides a conversion ratio between the input voltage and the output voltage and wherein the selected operational mode comprises a first phase and a second phase. Furthermore the method comprises the steps of: (4) configuring one or more capacitors of the capacitor bank according to a first configuration by said means to couple and decouple a plurality of components during the first phase of the operational mode, (5) configuring one or more capacitors of the capacitor bank according to a second configuration by said means to couple and decouple a plurality of components during the second phase of the operational mode, (6) implement the selected operational mode by alternating repeatedly between the first phase of step (4) and the second phase of step (5) at the commutation cycle rate until the end of an execution cycle, and (7) go back to step (2) after the end of the execution cycle.

SHORT DESCRIPTION OF THE FIGURES

The disclosure is explained below in an exemplary manner with reference to the accompanying drawings, wherein.

DETAILED DESCRIPTION OF PREFERRED EMBODIMENTS

Figure 1A:
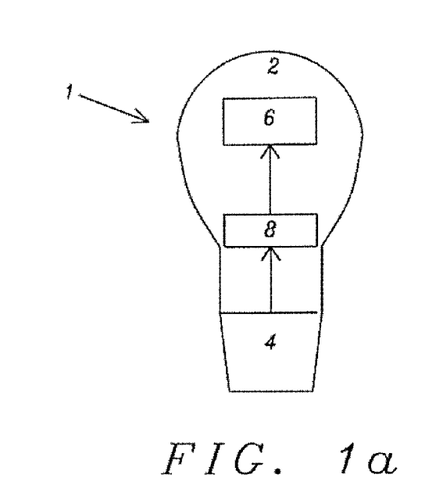
FIG. 1*a* illustrates a block diagram of an example light bulb.

FIG. 1a is a schematic view of a light bulb assembly 1. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 is provided within the housing 2. Examples for such light sources 6 are a solid state light source 6, such as a light emitting diode (LED) or an organic light emitting diode (OLED) (the latter technology is referred to as solid state lighting, SSL). The light source 6 may be provided by a single light emitting device, or by a plurality of LEDs. In the present document, the light source 6 is preferably a (high voltage) SSL device (comprising a plurality of SSL sources, e.g. a plurality of LEDs, in series).

Driver circuit 8 is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6. Furthermore, the driver circuit 8 is typically configured to provide the (constant) supply voltage to the solid state light source 6. For this purpose, the driver circuit 8 typically comprises a power converter.

The housing 2 provides a suitably robust enclosure for the light source and drive components, and includes optical elements that may be required for providing the desired output light from the assembly 1. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

The present document describes a driver circuit 8 (and a corresponding method) for driving a light source 6 requiring a relatively high load voltage. In other words, the driver circuit 8 is configured for driving a light source 6 that requires a (constant) drive voltage (i.e. a voltage drop across the light source 6) which is high compared to the rectified mains voltage (i.e. to an input voltage of the driver circuit 8). Typically, a high voltage light source 6 has a voltage drop of approximately 20% or more, 30% or more, 40% or more, 50% or more, 60% or more, 70% or more, 80% or more, 90% or more, 100% of the rectified mains voltage.

In the present document, it is proposed to use switched capacitor technology within the driver circuit 8. As will be outlined in the present document, switched capacitor technology can be applied successfully for the provision of high drive voltages (e.g. >100V, up to e.g. 400V). By combining the switched capacitor technology with appropriate signal processing, a new class of SSL device (e.g. LED) off-line driver circuits 8 may be implemented. These driver circuits 8 are entirely free of inductive components, they may be fully integrated and typically require only a low number of relatively small (ceramic) storage capacitors. The switched capacitor based driver circuits 8 may be implemented at reduced costs and at small sizes. Furthermore, the switched capacitor based driver circuits 8 provide a high efficiency of more than 85%, and a high lifetime. In addition, the switched capacitor based driver circuits 8 are adapted to control the light sources 6 (i.e. the SSL devices), such that the emitted light is free from flicker.

Figure 1B:
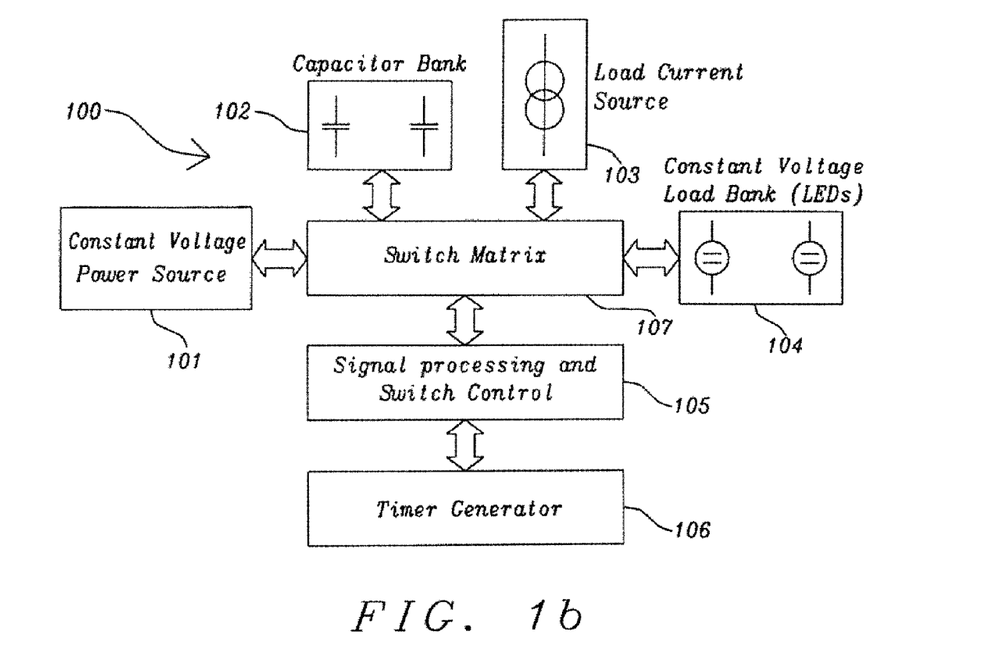
FIG. 1*b* shows a block diagram of an example driver circuit for a high voltage SSL device.

FIG. 1b shows a block diagram 100 which illustrates the underlying principle of a switched capacitor based driver circuit 8. The driver circuit 8 comprises a switch matrix 107 which is configured to couple/decouple a plurality of components, in order to generate an appropriate output voltage for driving the (constant voltage) load 104 (i.e. for driving the SSL device or light source 6). A first component which may be coupled/decoupled by the switch matrix 107 is a DC (direct current) input voltage from a voltage power source 101. The DC input voltage may e.g. be a rectified voltage derived from the mains power supply. A second component is a capacitor bank 102, a third component is a load current source 103 and a fourth component is the (constant voltage) load 104. These components are coupled/decoupled in various configurations or constellations using the switch matrix 107, in order to convert the input voltage into an appropriate output voltage for supplying voltage to the (constant voltage) load 104. The switch matrix 107 is controlled by a switch control unit 105, which is clocked by a clocking signal from a clock generator 106.

The switch control unit 105 controls the sequence and the timing of the different configurations of the switch matrix 107. By way of example, the switch matrix 107 may be configured to couple different components according to a first configuration and according to a different second configuration. The switch control unit 105 may control the switch matrix 107 to alternate between the first and second configurations at a commutation cycle rate (i.e. at a certain frequency). The commutation cycle rate may be set based on the clocking signal from the clock generator 106. The first and second configurations and the commutation cycle rate may define a particular operational mode of the driver circuit 8, wherein the particular operational mode implements a corresponding conversion ratio between the input voltage from the constant voltage power source 101 and the output voltage for supplying voltage to the (constant voltage) load 104.

The operational mode of the driver circuit 8 may be set such that the conversion losses of the driver circuit 8 are reduced or minimized, while at the same time providing an appropriate output voltage towards the load 104. In other words, by choosing a particular configuration of the capacitor network 102, the load voltage network 104, the load current source 103 and the input voltage 101 for a plurality of switching phases of the switch matrix 107, the conversion losses of the driver circuit 8 may be reduced (minimized) by reducing (minimizing) the power loss in the load current source 103.

Figure 2:
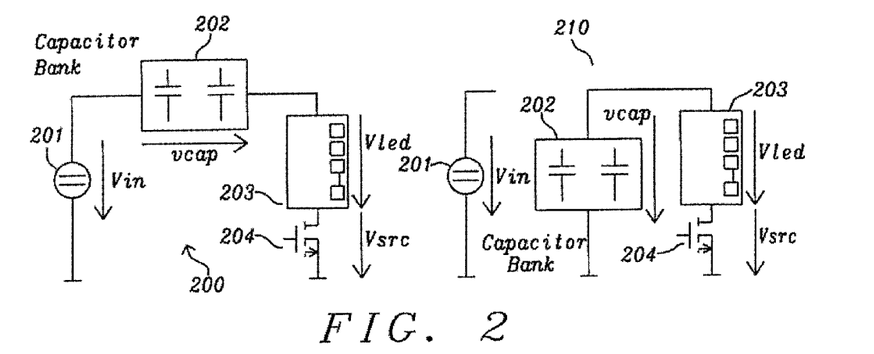
FIG. 2 illustrates the functional principle of an example capacitor based driver circuit.

The functional principle of a switched capacitor based driver circuit 8 (and in particular of a switched capacitor based power converter comprised within the driver circuit 8) is further illustrated in FIG. 2. FIG. 2 illustrates how the alternation between different configurations of a capacitor bank 102, 202 may be used to convert an input voltage Vin into an output voltage Vout. The capacitor bank 102, 202 is operated in a first configuration during a first phase 200 and in a second configuration during a second phase 210. During the first phase 200, the input voltage source 201 is coupled to the (constant voltage) load 203 (e.g. to the SSL device) via the capacitor bank 202. The (constant voltage) load 203 is coupled to a load current source 204 (e.g. a transistor, such as a MOS (PMOS or NMOS) transistor). The load current source 204 controls the current through the (constant voltage)

load 203 (i.e. through the light source 6), thereby controlling the intensity of the light emitted by the (constant voltage) load 203.

In the first phase 200, the input voltage Vin (at the voltage source 201) is equal to the sum of the voltage drop Vcap at the capacitor bank 202, the voltage drop Vled at the (constant voltage) load 203 and the voltage drop Vsrc 204 at the load current source 204. In this first phase 200, the capacitors in the capacitor bank 202 are charged, wherein the charge $q_1$ stored within the capacitor bank 202 may be $q_1=C*Vcap$, with C being the capacitance of the capacitor bank 202 and with Vcap=Vin−Vled−Vsrc, such that $q_1=C*(Vin-Vled-Vsc)$.

During the second phase 210, the capacitor bank 202 is decoupled from the input voltage source 201 and coupled to ground, such that the capacitor bank 202 is arranged in parallel to the (constant voltage) load 203 and the load current source 204. In the second phase 220, the voltage drop Vcap at the capacitor bank 202 is equal to the sum of the voltage drop Vled at the (constant voltage) load 203 and the voltage drop Vsrc 204 at the load current source 204, i.e. Vcap=Vled+Vsrc. During the second phase 210, the capacitors in the capacitor bank 202 may be discharged to a charge level $q_2=C*Vcap=C*(Vled+Vsrc)$.

If the first and second phases 200, 210 are repeated at a certain frequency f, the charging and discharging process occurs at the capacitor bank 202 at the frequency f, thereby providing a current. In an embodiment, the current I may be $I=(q_1-q_2)*f=(Vin-2*Vled-2*Vsrc)*f$ to the (constant voltage) load 203. The current flow through the load 203 can be controlled using the current source 204. Furthermore, it can be ensured that the output voltage Vout=Vled+Vsrc is reduced compared to the input voltage Vin, thereby implementing the voltage conversion of the driver circuit 8. In particular, during the first phase 200, the reduced output voltage is Vout=Vin−Vcap and during the second phase 210, the reduced output voltage is Vout=Vcap.

Typically, the frequency f (also referred to as the commutation cycle rate) is in the range of about 10 kHz to 100 kHz. The ratio of the duration of the first phase compared to the duration of a complete commutation cycle (comprising the first phase and a succeeding second phase) may be referred to as the duty cycle. Typical values for the duty cycle are approx. 50%. It can be shown that when using frequencies f in the above mentioned range, the switched capacitor bank 202 functions as a voltage divider. In certain embodiments, the voltage conversion ratio provided by such a voltage divider may depend on the capacitance C and the frequency f.

The above explanation relates to one operational principle of a standard switched capacitor. It must be noted that other functional principles exist for voltage dividers based on switched capacitors. In some embodiments, the voltage division or conversion rate does not depend on the values of the capacitance C and the frequency f and is determined only on the circuit arrangement. Furthermore, in embodiments the values for the capacitances C in the capacitor bank 102 must not be identical.

It should be noted that the frequency or commutation cycle rate f (i.e. the rate at which the power converter cycles through a first phase and a succeeding second phase) is typically asynchronous to the mains frequency. Furthermore, the frequency f may be varied or modulated. By way of example, the frequency or commutation cycle rate f may be varied in a sweep between 40-60 kHz. By varying the frequency f, electromagnetic interference (EMI) filter components of a driver circuit (see e.g. FIG. 4) may be made smaller, as the extent of distortions caused by the power converter onto the mains power supply may be reduced.

Figure 3:
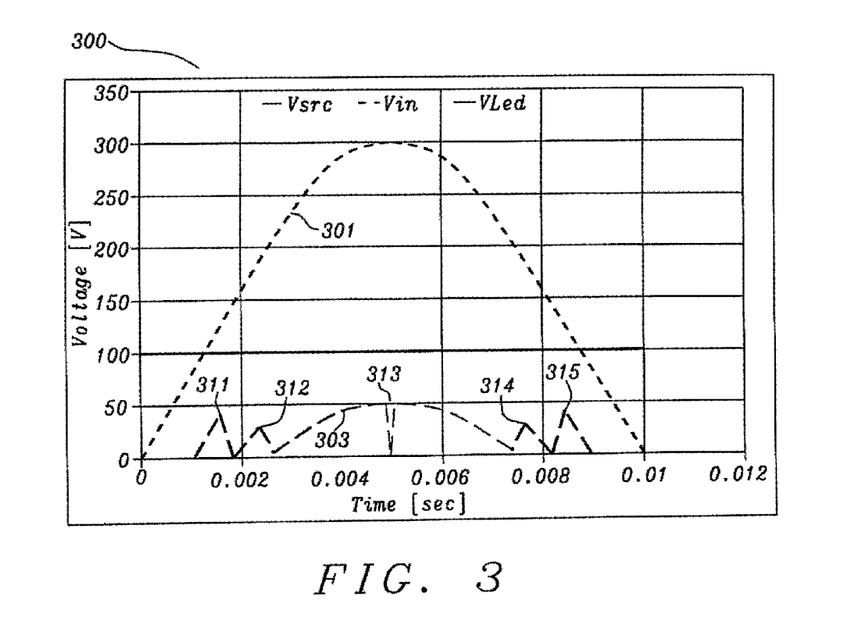
FIG. 3 shows the voltage drop at the current source of an example driver circuit.
Figure 4:
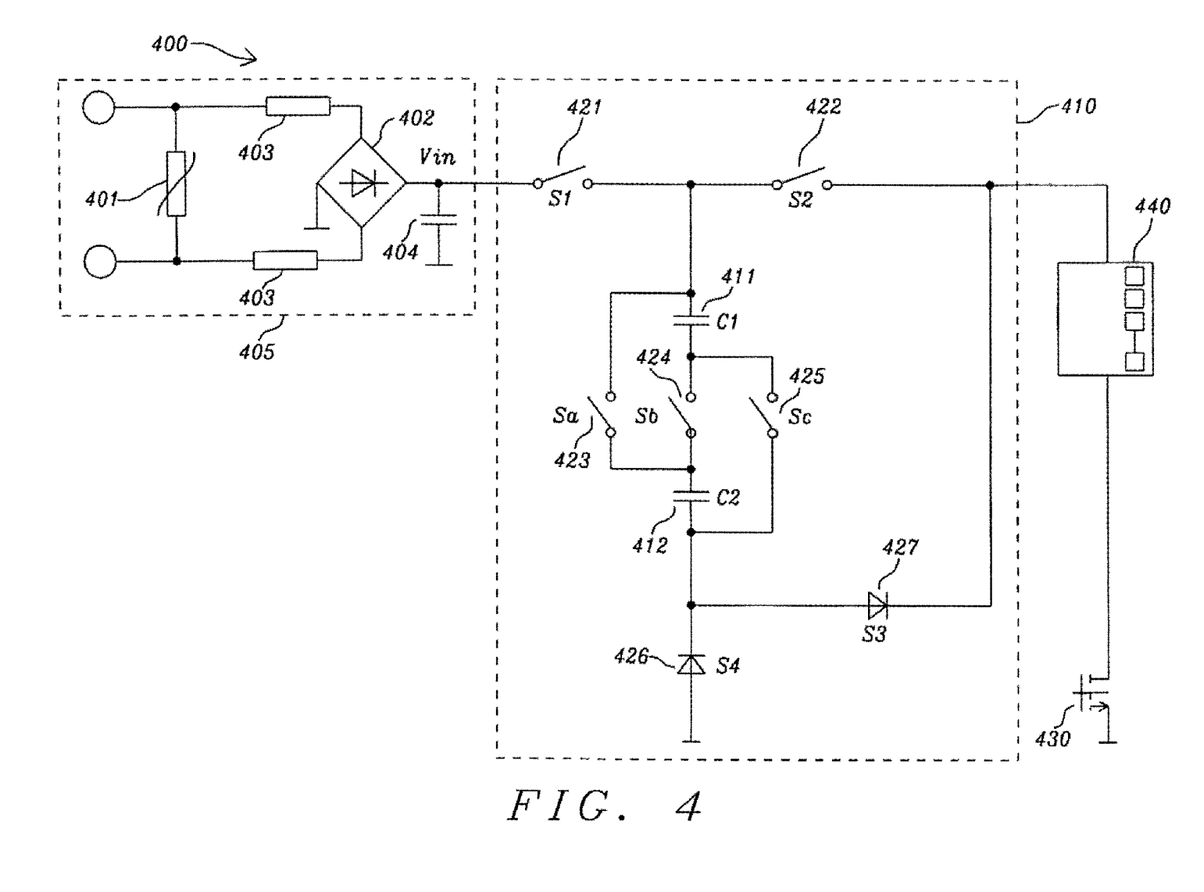
FIG. 4 shows the circuit diagram of an example driver circuit for a high voltage SSL device.

FIG. 4 shows a circuit diagram 400 of an example driver circuit for a constant voltage load, such as a (high voltage) SSL device 440. The circuit diagram 400 shows a rectifier circuit 405 configured to rectify an input voltage waveform of a mains power supply 401 (e.g. an 110V or 230V AC mains power supply). The rectifier circuit 405 comprises a rectifier 402 in combination with EMI (electromagnetic interference) filter components 403, 404. The output of the rectifier circuit 405 may be a (half-wave or full-wave) rectified version of the input voltage waveform, of which an example half-wave is shown as input voltage 301 in FIG. 3.

Furthermore, FIG. 4 illustrates a power converter 410 for the SSL device 440. The power converter 410 comprises a plurality of switches 421 (S1), 422 (S2), 423 (Sa), 424 (Sb), 425 (Sc), a plurality of diodes (or switches) 426 (S4), 427 (S3), as well as the capacitors 411 (C1) and C2 (412). Furthermore, FIG. 4 shows a current source 430 which maintains the current through the SSL device 440 at a pre-determined level, thereby ensuring that the intensity of the light emitted by the SSL device 440 stays at a constant level. The power converter 410 and the current source 430 are typically comprised within the driver circuit 8 of the SSL device 440.

The power converter 410 is configured to convert the rectified input voltage such that the constant voltage Vled is provided at the SSL device 440 and such that the voltage drop Vsrc across the current source 430 is maintained below or at a maximum voltage, thereby ensuring that the power loss at the current source 430 is kept below a maximum power level. For this purpose, the plurality of switches of the power converter 410 may switched according to different modes, wherein each mode allows for a different conversion ratio between the input voltage Vin (being the rectified input voltage waveform from the mains power supply 401) and the output voltage Vout, with the output voltage Vout being the sum of the voltage Vled across the SSL device 440 and the voltage Vsrc across the current source 430, i.e. Vout=Vled+Vsrc.

TABLE 1

| Mode | Vout/Vin | Phase 1 | Phase 2 | F = 100 kHz, 50% d.c. |
|------|----------|---------|---------|------------------------|
| 1 | 1 | S1, S2 | S1, S2 | Fixed on |
| 2 | 2/3 | S1, Sa, Sc | S2, Sb | |
| 3 | 0.5 | S1, Sa, Sc | S2, Sa, Sc | Sb fixed on |
| 4 | 1/3 | S1, Sb | S2, Sa, Sc | |

Table 1 shows example modes of the power converter 410 of FIG. 4 and the corresponding conversion ratios between Vin and Vout. The switches listed in the first and second phase of Table 1 indicate the switches which are in the on-state. The other switches are typically in the off-state. Each mode comprises a first phase (phase 1) (typically used for charging the capacitors 411, 412) and a second phase (phase 2) (typically used for discharging the capacitors 411, 412). Mode 1 provides a conversion ratio 1 (i.e. Vin=Vout) which does not make use of the capacitors 411, 412. Mode 1 comprises a first and second phase, where the switches S1 421 and S2 422 are continuously closed (and the other switches are open), thereby providing the input voltage Vin directly to the output. In case of Mode 1, the first phase and the second phase are equal, thereby providing a fixed on of the switches S1 and S2. Mode 2 provides a conversion ratio 2/3 (i.e. Vout=2/3*Vin). During the first phase of mode 2, only the switches S1 421, Sa 423 and Sc 425 are closed (and the other switches are open), thereby charging the capacitors C1 411 and C2 412 in parallel. In the second phase of mode 2, only the switch S2 422 and Sb 424 are closed (and the other switches are open), thereby discharging the capacitors C1 411 and C2 412 in series.

As outlined above, the sequence of a first phase and a second phase is typically referred to as a commutation cycle. The power converter 410 alternates between the first phase and the second phase at a frequency f or commutation cycle rate of 100 kHz with a 50% duty cycle (d.c.) (i.e. with an equal length of the first and the second phase). By appropriately selecting the capacitance value of the capacitors C1 411 and C2 412, the conversion ratio of Vout=2/3*Vin can be ensured. In a similar manner, a conversion ratio of 1/2 can be achieved with the capacitor configurations of mode 3 and a conversion ratio of 1/3 can be achieved with the capacitor configurations of mode 4. It should be noted that the above mentioned frequency f and duty cycle are only examples, and other values for f and/or the duty cycle are possible.

The power converter 410 of FIG. 4 may be controlled by the control unit 105 (comprised within the power converter 410 or within the driver circuit 8) to operate in one of the four operational modes listed in Table 1. In particular, the control unit 105 may select an appropriate operation mode for the power converter 410 based on the value of the input voltage Vin. Even more particularly, the appropriate operational mode (i.e. the conversion ratio) of the power converter 410 may be selected such that the output voltage Vout of the power converter is maintained within pre-determined voltage bounds. Hence, the output voltage Vout can be controlled such that the voltage drop Vsrc across the current source 430 remains below a pre-determined maximum value. For this purpose, the control unit 105 may operate the power converter 410 in one of the modes listed in Table 1, depending on the present level of the continuously charging input voltage Vin.

This is illustrated in the voltage diagram 300 of FIG. 3, which shows the (rectified) input voltage Vin 301 and the constant voltage Vled 302 at the SSL device 440. Furthermore, the voltage diagram 300 shows the voltage drop Vsrc 303 across the current source 430. In the illustrated example, the constant voltage Vled 302 is 100V and the voltage drop Vsrc 303 is controlled by the control unit 105 to remain below a maximum voltage Vmax=50V. As long as Vin 301 is below Vled+Vmax (i.e. below 150V), the power converter 410 is operated in mode 1, thereby coupling the input voltage Vin 301 directly to the output voltage Vout. At the time instant 311, Vin 301 exceeds Vled+Vmax (i.e. 150V) and the power converter 410 is switched to mode 2, thereby reducing the output voltage Vout to 2/3 of the input voltage, i.e. thereby reducing the voltage drop Vsrc 303 at the current source 430 to zero (at time instant 311). Subsequently, the input voltage Vin 301 continues to increase (thereby increasing the voltage drop Vsrc 303) and at time ° instant 312, the input voltage Vin 301 exceeds 200V and the power converter 410 switches to mode 3, thereby reducing the output voltage Vout to ½ of the input voltage, i.e. thereby reducing the voltage drop Vsrc 303 at the current source 430 to zero again (at time instant 312). Subsequently, the input voltage Vin 301 continues to increase (thereby increasing the voltage drop Vsrc 303) and at time instant 313, the input voltage Vin 301 reaches 300V and the power converter 410 may briefly switch to mode 4, thereby reducing the output voltage Vout to ⅓ of the input voltage, i.e. thereby reducing the voltage drop Vsrc 303 at the current source 430 to zero again (at time instant 313). As soon as the input voltage Vin goes below 300V, the power converter 410 switches back to the mode 3, at time instant 314 back to mode 2 and at time instant 315 back to mode 1.

It must be noted that the above voltage values are only examples and the present disclosure is not limited to these values and may be applied to other values. For example, the constant voltage drop Vled 302 at the SSL device 440 may only be 50V and the voltage drop Vsrc 303 across the current source 430 may be limited to 10V. In this case, the power converter 410 would switch modes so as to limit Vled+Vmax to 60V.

The above mentioned process of switching the power converter 410 between different modes, in order to maintain the voltage drop Vsrc 303 across the current source 430 at a minimum level, while ensuring that the output voltage Vout is at or above the constant load voltage Vled 302 at the SSL device 440 may be repeated in sync with the mains frequency (e.g. 50 Hz or 60 Hz). It should be noted that the power converter 410 may be provided with an output capacitor in parallel to the SSL device 440, in order to bridge periods of the input voltage Vin, where the input voltage Vin is below the constant load voltage Vled 302.

As outlined above, it may be desirable to maintain the voltage drop across the current source 204 below a pre-determined maximum current source voltage, in order to reduce the power losses incurred at the current source 204. The losses incurred at the current source 204, i.e. the power at the current source 204, is typically a function of the current $I_{src}$ through the current source 204 and the voltage drop $V_{src}$ at the current source 204. In particular, the losses may be proportional to the product of the current $I_{src}$ and the voltage drop $V_{src}$. As such, it may be beneficial to adjust the current $I_{src}$ provided by the current source 204 to the SSL device 203 as a function of the voltage drop $V_{src}$ at the current source 204. In this case, the control unit 105 may be configured to select and/or set one of the plurality of operational modes, such that the power loss on the current source 204 is maintained below a pre-determined power loss threshold. In an embodiment, the current $I_{src}$ may be increased when the voltage drop $V_{src}$ is relatively low, and the current $I_{src}$ may be decreased when the voltage drop $V_{src}$ is relatively high. By way of example, the current $I_{src}$ provided by the current source 204 to the SSL device 203 may depend on the operational mode of the power converter, as the operational mode of the power converter typically has an influence on the voltage drop $V_{src}$ across the current source 204. The current $I_{src}$ provided by the current source 204 should be varied such that the average current $I_{src}$ to the SSL device 203 remains constant, thereby maintaining the intensity of the light emitted by the SSL device 203 at a constant level.

Figure 5:
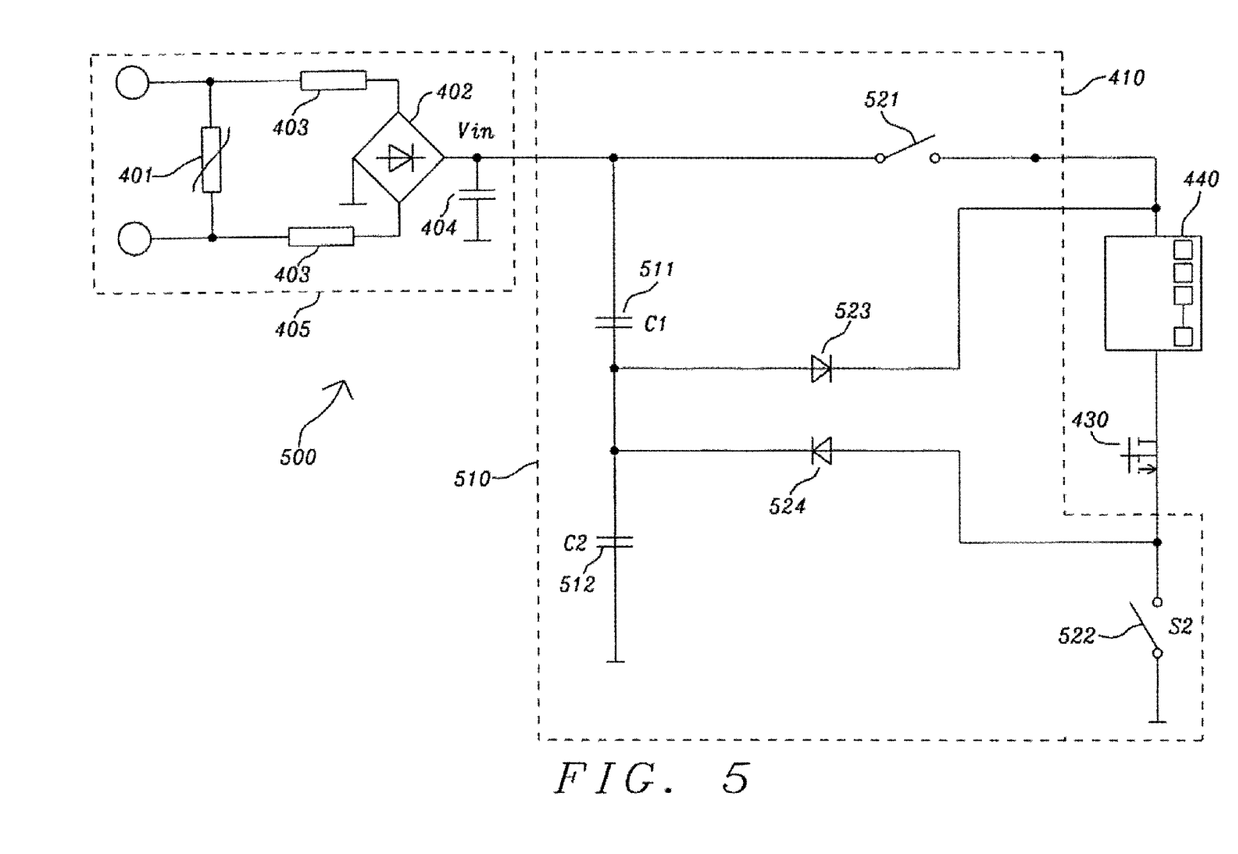
FIG. 5 shows the circuit diagram of another example driver circuit for a high voltage SSL device.

FIG. 5 shows a circuit diagram 500 of another example power converter 510 for generating an output voltage Vout across the SSL device 440 and the current source 430 which minimizes the voltage drop Vsrc across the current source 430, while providing the constant load voltage Vled at the SSL device 440. The modes, the corresponding conversion ratios and the respective switches which are in on-state during phase 1 and phase 2 are listed in Table 2. The switches not listed for a particular phase in the Table are in off-state. The power converter 510 comprises a plurality of switches 521, 522, a plurality of switches or diodes 523, 524 and a plurality of capacitors 511, 512.

TABLE 2

| Mode | Vout/Vin | Phase 1 | Phase 2 | F = 100 kHz, 50% d.c. |
|---|---|---|---|---|
| 1 | 1 | S1, S2 | S1, S2 | Fixed on |
| 2 | 0.5 | S1 | S2 | |

The power converters 410, 510 comprise diodes, e.g. diodes 426, 426, 523, 524. The diodes provide an automatic switching function based on the voltage applied across the diodes. A diode is in the off-state when reverse-biased (i.e. when applying a negative voltage across the diode). On the other hand, a diode is in the on-state when forward-biased with a positive voltage across the diode which exceeds a cut-in voltage. The diodes may be Schottky diodes if a low cut-in voltage across the diode is required (thereby reducing losses). Alternatively the diodes may be implemented as active switching elements (e.g. transistors such as MOS transistors).

It should be noted that all the components (i.e. notably the switches and the diodes) of the power converter 410, 510 can be integrated onto an integrated circuit (e.g. into a single chip or package). Only the capacitors may need to be provided separately. Furthermore, the current source 430 may be integrated within the same integrated circuit as the power converter 410, 510. Overall, the driver circuits 8 described in the present document may be implemented as a single integrated circuit (possible with separate off-chip capacitors for implementing the capacitor bank 202).

Figure 1C:
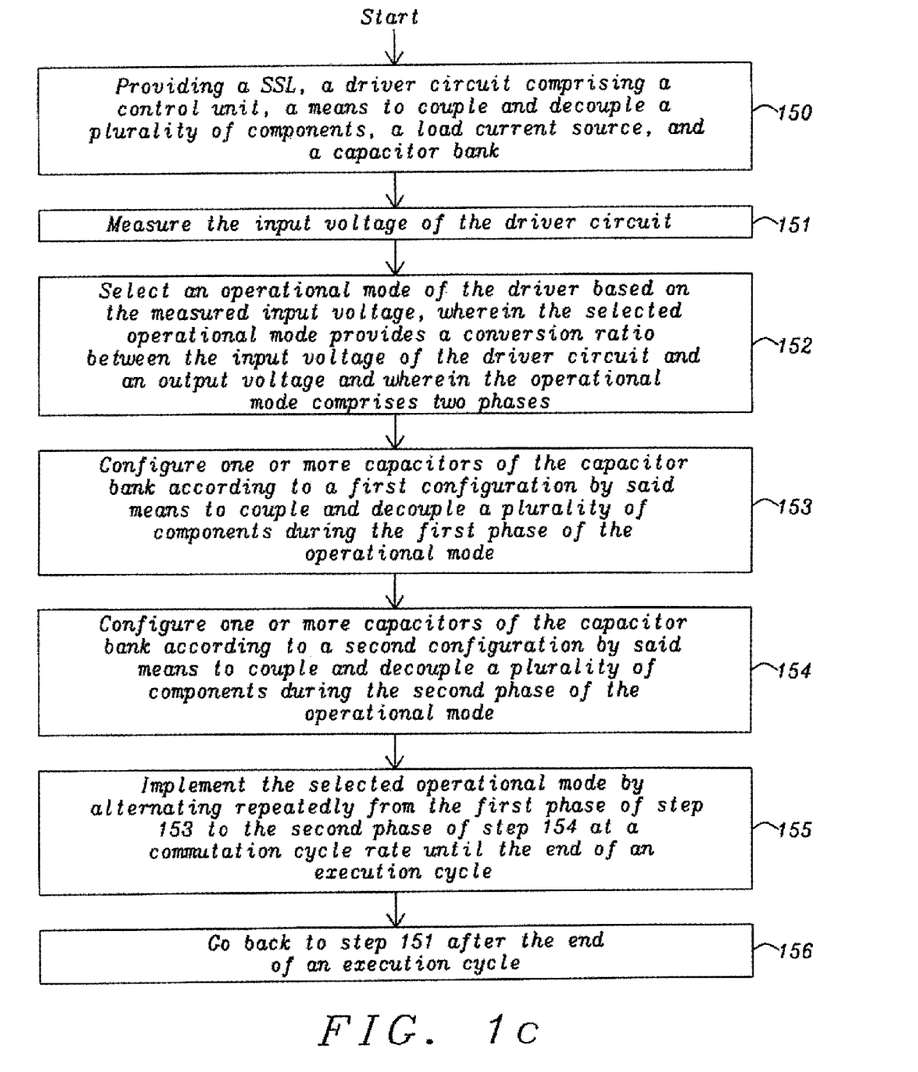
FIG. 1*c* shows a flow chart of an example method for driving a high voltage SSL device.

FIG. 1c shows a flow chart of an example method 150 for controlling a power converter 410 for providing an output voltage Vout at the SSL device 440 and the current source 430 (which are arranged in series) based on the input voltage Vin. The method may be executed by the control unit 105. The method may be executed at a certain executing rate, wherein the execution rate is typically dependent on the mains frequency. By way of example, the execution rate may be a multiple of the mains frequency which allows for an appropriate sampling of the waveform of the input voltage Vin. The execution rate may be e.g. 10 (or more) or 100 (or more) times the mains frequency. Furthermore, the method 150 may be executed in sync with the mains frequency. For this purpose, the method 150 may detect the mains frequency and the phase of the input voltage Vin (e.g. from the waveform of the input voltage Vin).

The method 150 firstly comprises the step 150 illustrating a provision of a SSL, a driver circuit comprising a control unit, a means to couple and decouple a plurality of components, a load current source, and a capacitor bank. The following step 151 describes measuring the input voltage Vin of the driver circuit. Subsequently, in step 152 an operational mode of the power converter 410 is selected based on the measured input voltage Vin. As outlined above, the different operational modes of the power converter 410 provide different conversion ratios between the input voltage Vin and the output voltage Vout of the power converter 430. Furthermore, it has already been outlined that the operational modes of the power converter 430 typically comprise a first phase and a second phase. Step 153 illustrates configuring the one or more capacitors 411, 412 of the power converter 410 according to a first configuration using the switches 421, 422 of the power converter 410 during the first phase. The first configuration is typically used to charge the one or more capacitors 411, 412. Step 154 depicts configuring the one or more capacitors 411, 412 according to a different second configuration using the switches 421, 422 of the power converter 410 during the second phase. The second configuration is typically used to discharge (at least partially) the one or more capacitors 411, 412. The method proceeds in step 155 by implementing the selected operational mode of the power converter 410 by alternating between the first phase and the second phase at the commutation cycle rate. As outlined above, the commutation cycle rate is typically in the range of 100 kHz, i.e. the communication cycle rate is typically several orders of magnitude higher than the mains frequency. As outlined above, in step 156 the process steps—151-156 are repeated by going back to step 151 at a pre-determined execution rate, i.e. the method 150 starts again after the expiration of an execution cycle, which is according the execution rate.

In the present document, various power converters have been described which make use of switched capacitors, in order to provide different conversion ratios in the context of different operational modes. In the illustrated examples, an operational mode typically comprises two phase (i.e. a first phase and a second phase). It should be noted that an operational mode may comprise more than two phases which are executed within each cycle of the operational mode. By way of example, an operational mode may comprise a first phase with a first capacitor configuration, a succeeding second phase with a second capacitor configuration and a succeeding third phase with a third capacitor configuration. A cycle of the operational mode may comprise the switching from the first phase to the second phase and to the third phases. Each cycle may be repeated at the commutation cycle rate f. As such, an operational mode may comprise more than two phases. Furthermore, it should be noted that an operational mode may also comprise a single phase (or a sequence of equal phases). This is shown e.g. in the operational modes 1 of Tables 1 and 2, where the switches S1 and S2 are fixed on. Hence, in general terms, an operational mode may comprise L phases, with L>0 (or L>1).

In the present document, the current source 204, 430 has been shown as a separate entity of the driver circuit. It should be noted that the current source 204, 403 (which has the function of a controller of the current through the SSL device) may be combined with the switches S1, S2, etc. comprised within the power converter. This may be achieved by operating some of the switches S1, S2, etc. of the power converter in a continuous mode (e.g. within the linear region of operation of the transistors), thereby varying the current through some of the switches S1, S2, etc. of the power converter during their on-state, i.e. thereby controlling the current towards the SSL device.

It should be noted that a driver circuit may be configured to drive two SSL devices in parallel. As such, the driver circuit comprises two sub-systems for providing a drive voltage and a drive current to the two SSL devices. The two sub-systems may be designed such that from the point of view of the mains power supply, a substantially constant current is flowing. In such cases, the EMI filter components may be obsolete. In particular, the two-subsystems, i.e. in particular the respective two power converters may be operated at opposed phases. By way of example, both power converters may be operated in a particular operational mode, however, while the first power converter is in the first phase of the particular operational mode, the second power converter is in the second phase of the particular operational mode and vice versa. Hence, the power converters may be operated out of phase. In embodiments, the two power converter operating out of phase may be used to drive one common SSL device. The SSL device may be appropriately coupled, e.g. via diodes, to the power converters to alternately receive power from one of the power converters. As before, the power drawn from the mains is substantially constant, reducing the requirements to the EMI filter, possibly even eliminating the EMI filter.

In the present document a power converter and a driver circuit (as well as corresponding methods) for driving a (high voltage) SSL device have been described. The power converter/driver circuit make use of switched capacitor technology, in order to provide a plurality of operation modes (and a corresponding plurality of conversion ratios). The power converter/driver circuit can switch operation between the different operational modes (i.e. the different conversion ratios), thereby ensuring that a voltage drop across a load current source is minimized, while providing the (constant) load voltage at an SSL device coupled to the power converter/driver circuit.

In the present document, the term "couple" or "coupled" refers to elements being in electrical communication with each other, whether directly connected e.g., via wires, or in some other manner.

It should be noted that the description and drawings merely illustrate the principles of the proposed methods and systems. Those skilled in the art will be able to implement various arrangements that, although not explicitly described or shown herein, embody the principles of the disclosure and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the disclosure, as well as specific examples thereof, are intended to encompass equivalents thereof.

The invention claimed is:

1. A solid state lighting (SSL) light bulb assembly comprising:
   a SSL device;
   a driver circuit, converting supply electricity received through an electrical connection module into a controlled drive current for the SSL device, comprising:
      a first power converter converting a varying input voltage at an input of the power converter into an output voltage at an output of the power converter supplying the output voltage to the solid state lighting, comprising;
      one or more capacitors;
      a plurality of switches coupling said one or more capacitors with one another, with the input and/or with the output of the power converter according to a plurality of configurations; and
      a control unit operating the power converter in a plurality of operational modes providing a corresponding plurality of different conversion ratios between the input voltage and the output voltage of the power converter, wherein a first operational mode of said plurality of operational modes comprises a first phase, during which the one or more capacitors are arranged in a first configuration from said plurality of configurations, and a second phase, during which the one or more capacitors are arranged in a different second configuration from the plurality of configurations, and
   a current source at the output of the first power converter, supplying a constant current to the SSL device, when the SSL device is coupled to the output of the first power converter.

2. The light bulb assembly of claim 1, wherein
   the input voltage is derived from a rectified version of a mains supply voltage alternating at a mains frequency;
   the input voltage varies in accordance to the mains frequency; and
   the control unit is configured to measure the input voltage for setting the one of the plurality of operational modes.

3. The light bulb assembly of claim 2, wherein the control unit sets one of the pluralities of operational modes in sync with the mains frequency.

4. The light bulb assembly of claim 1, wherein the control unit sets one of the plurality of operational modes, such that a voltage drop across the current source does not exceed a pre-determined maximum current source voltage.

5. The light bulb assembly of claim 1, wherein the control unit is configured to set one of the plurality of operational modes, such that the output voltage meets or exceeds a pre-determined load voltage of the SSL device.

6. The light bulb assembly of claim 1, wherein the control unit is configured to control the plurality of switches to switch from the first phase to the second phase, thereby operating the power converter in the first operational mode.

7. The light bulb assembly of claim 1, wherein the control unit is configured to set the one of the plurality of operational modes based on the varying input voltage.

8. The light bulb assembly of claim 1, wherein the control unit is configured to repeat the first phase and the succeeding second phase at a commutation cycle rate.

9. The light bulb assembly of claim 8, wherein the control unit is configured to alternate between the first phase and the second phase of the first operational mode, such that an average charge across the one or more capacitors is maintained constant.

10. The light bulb assembly of claim 8, wherein the control unit is continuously modifying the commutation cycle rate.

11. The light bulb assembly of claim 1, wherein the plurality of switches are MOS transistors.

12. The light bulb assembly of claim 1, wherein the control unit is configured to control the current through the SSL device, in particular so as to control the current flowing through the SSL device to be different for at least some of the plurality of operational modes.

13. The light bulb assembly of claim 1, wherein the power converter is implemented as an integrated circuit on a single chip or in a single package, with only the one or more capacitors being external to the integrated circuit.

14. The light bulb assembly of claim 1 wherein the driver circuit is located within a housing of the light bulb.

15. The light bulb assembly of claim 1 wherein the SSL device comprises a plurality of SSL sources.

16. The light bulb assembly of claim 1 wherein a housing of the light bulb provides a heat-sink capability.

17. The light bulb assembly of claim 1 wherein the driver circuit is driving the SSL device requiring a drive voltage, which is high compared to an input voltage of the driver circuit.

18. The light bulb assembly of claim 1 wherein the driver circuit is entirely free of inductive components.

19. The light bulb assembly of claim 1 wherein the current source is deployed in series with the SSL device.

20. The light bulb assembly of claim 1 wherein the power converter converts an rectified input voltage Vin such that a constant voltage Vled is provided across the SSL device and such that the voltage drop Vsrc across the current source is maintained below or at a maximum voltage, thereby ensuring that the power loss at the current source is kept below a maximum power level.

21. The light bulb assembly of claim 20 wherein the plurality of switches of the power converter is switched according to different modes, wherein each mode allows for a different conversion ratio between the rectified input voltage Vin and an output voltage Vout, with the output voltage Vout being the sum of the voltage Vled across the SSL device and the voltage Vsrc across the current source.

22. A driver circuit to control a solid state lighting, the driver circuit comprising:
   a first power converter converting a varying input voltage at an input of the power converter into an output voltage at an output of the power converter supplying the output voltage to the solid state lighting, comprising;
one or more capacitors;
a plurality of switches coupling said one or more capacitors with one another, with the input and/or with the output of the power converter according to a plurality of configurations; and
a control unit operating the power converter in a plurality of operational modes providing a corresponding plurality of different conversion ratios between the input voltage and the output voltage of the power converter, wherein a first operational mode of said plurality of operational modes comprises a first phase, during which the one or more capacitors are arranged in a first configuration from said plurality of configurations, and a second phase, during which the one or more capacitors are arranged in a different second configuration from the plurality of configurations.

23. The driver circuit of claim 22, wherein the control unit controls the plurality of switches to switch from the first phase to the second phase, thereby operating the power converter in the first operational mode.

24. The driver circuit of claim 22, wherein the control unit sets the one of the plurality of operational modes based on the varying input voltage.

25. The driver circuit of claim 22, wherein the control unit repeats the first phase and the succeeding second phase at a commutation cycle rate.

26. The driver circuit of claim 25, wherein the control unit alternates between the first phase and the second phase of the first operational mode, such that an average charge across the one or more capacitors is maintained constant.

27. The driver circuit of claim 25, wherein the control unit is continuously modifying the commutation cycle rate.

28. The driver circuit of claim 22, wherein the plurality of switches are MOS transistors.

29. The driver circuit of claim 22, wherein the power converter is implemented as an integrated circuit on a single chip or in a single package, with only the one or more capacitors being external to the integrated circuit.

30. The driver circuit of claim 22 to control a second SSL device, the driver circuit comprising a second power converter for supplying the second SSL device; wherein
the first and second power converters are operable in a plurality of operational modes comprising respective first phases and second phases; and
when the first power converter is operated in the first phase of a particular operational mode of the plurality of operational modes, the second power converter is operated in the second phase of the particular operational mode of the plurality of operational modes, and vice versa.

31. A power converter to convert a varying input voltage at an input into an output voltage at an output; wherein the power converter is configured to supply the output voltage to a solid state lighting device in series with a current source; the power converter comprising:
an input port to receive a rectified input voltage;
a first switch, wherein a first terminal of the switch is connected to the input port and a second terminal of the first switch is connected to a first output port;
a first capacitor, wherein a first terminal is connected to the input port and a second terminal is connected to an anode of a first diode to a cathode of a second diode and to a first terminal of a second capacitor;
said first diode, wherein a cathode is connected to the first output port;
said second diode wherein an anode is connected to a second output port;
said second capacitor, wherein a second terminal is connected to ground;
a second switch wherein a first terminal is connected to the second output port and a second terminal is connected to ground; and
said first and second output ports wherein a load is connected between both output ports.

32. The power converter of claim 31, wherein said first and second diodes are replaced by switches.

33. A power converter to convert a varying input voltage at an input into an output voltage at an output; wherein the power converter is configured to supply the output voltage to a solid state lighting device in series with a current source; the power converter comprising:
an input port to receive a rectified input voltage;
a first switch, wherein a first terminal of the switch is connected to the input port and a second terminal of the first switch is connected to a first terminal of a second switch, to a first terminal of a third switch, and to a first terminal of a first capacitor;
said second switch wherein a second terminal is connected to an output port of the power converter;
said third switch wherein a second terminal of the second switch is connected to a first terminal of a second capacitor and to a second terminal of a fourth switch;
said first capacitor, wherein a second terminal is connected to a first terminal of the fourth switch and to a first terminal of a fifth switch;
said fourth switch;
said fifth switch wherein a second terminal of the fifth switch is connected to a second terminal of the second capacitor;
said second capacitor wherein a second terminal is connected to an anode of a first diode and to a cathode of a second diode;
said first diode, wherein a cathode is connected to the output port;
said second diode wherein an anode is connected to ground; and
said output port wherein a load is connected between the output port and ground.

34. The driver circuit of claim 33, wherein said first and second diodes are replaced by switches.

35. A method for converting a varying input voltage into an output voltage for a solid state lighting device in series with a current source; the method comprising:
(1) providing a SSL, a driver circuit comprising a control unit, a means to couple and decouple a plurality of components, a load current source, and a capacitor
(2) measuring the input voltage;
(3) selecting an operational mode based on the measured input voltage, wherein the selected operational mode provides a conversion ratio between the input voltage and the output voltage and wherein the selected operational mode comprises a first phase and a second phase;
(4) configuring one or more capacitors of the capacitor bank according to a first configuration by said means to couple and decouple a plurality of components during the first phase of the operational mode;
(5) configuring one or more capacitors of the capacitor bank according to a second configuration by said means to couple and decouple a plurality of components during the second phase of the operational mode;
(6) implement the selected operational mode by alternating repeatedly between the first phase of step (4) and the second phase of step (5) at the commutation cycle rate until the end of an execution cycle; and (7) go back to step (2) after the end of the execution cycle.

36. The method of claim 35, wherein the SSL and the current source are connected in series.

37. The method of claim 35, wherein said a means to couple and decouple a plurality of components are a plurality of switches.

38. The method of claim 35, wherein the method is executed by the control unit.

39. The method of claim 38, wherein the method is executed at a certain executing rate wherein the execution rate is dependent on a mains frequency.

40. The method of claim 39, wherein the execution rate is a multiple of the mains frequency which allows for an appropriate sampling of the waveform of the input voltage.

41. The method of claim 35, wherein the configuration of the first phase is used to charge the one or more capacitors and the configuration of the second phase is used to discharge the one or more capacitors.

42. The method of claim 35, wherein the alternating between the first phase and the second phase of the first operational mode is performed such that an average charge across the one or more capacitors is maintained constant.

* * * * *